(12) United States Patent
Liao et al.

(10) Patent No.: US 7,783,640 B2
(45) Date of Patent: Aug. 24, 2010

(54) DOCUMENT SUMMARIZATION

(75) Inventors: Ciya Liao, Mountain View, CA (US);
Omar Alonso, Redwood Shores, CA (US); Joaquin A. Delgado, Santa Clara, CA (US); Thomas H. Chang, Redwood Shores, CA (US); Meeten Bhavsar, Emerald Hills, CA (US)

(73) Assignee: Oracle International Corp., Redwood Shores, CA (US)

( * ) Notice: Subject to any disclaimer, the term of this patent is extended or adjusted under 35 U.S.C. 154(b) by 613 days.

(21) Appl. No.: 11/647,871

(22) Filed: Dec. 29, 2006

(65) Prior Publication Data

US 2008/0109399 A1 May 8, 2008

Related U.S. Application Data

(60) Provisional application No. 60/856,665, filed on Nov. 3, 2006.

(51) Int. Cl.
*G06F 7/00* (2006.01)
*G06F 17/30* (2006.01)
(52) U.S. Cl. .................. 707/736; 707/790; 715/254
(58) Field of Classification Search ................ 707/6, 707/103 R; 715/254, 255
See application file for complete search history.

(56) References Cited

U.S. PATENT DOCUMENTS

2002/0138528 A1* 9/2002 Gong et al. ................. 707/530
2003/0167267 A1* 9/2003 Kawatani ...................... 707/6
2005/0234972 A1* 10/2005 Zeng et al. ............. 707/103 R

OTHER PUBLICATIONS

"Example-Based Chinese Text Filtering Model"; Lin Hongfei; Zhan Xuegang; and Yao Tianshun; China; ICSC'99.*
"Mining the Web's Link Structure"; Soumen Chakrabarti; Byron E. Dom; S. Ravi Kumar; Prabhakar Raghavan; Sridhar Rajagopalan; Andrew Tomkins; David Gibson; and Jon Kleinberg.*

* cited by examiner

*Primary Examiner*—John E Breene
*Assistant Examiner*—Giovanna Colan
(74) *Attorney, Agent, or Firm*—Kraguljac & Kalnay, LLC (57) ABSTRACT

Systems, methods, and other embodiments associated with automatically summarizing a document are described. One method embodiment includes computing term scores for members of a set of terms in a document to be summarized and computing sentence scores for sentences in a set of sentences in the document. The method embodiment also includes computing a set of entries for a term-sentence matrix that relates terms to sentences. The method embodiment also includes computing a dominant topic for the document and simultaneously ranking the set of terms and the set of sentences based on the dominant topic. The method embodiment provides a summarization item(s) selected from the set of terms and/or the set of sentences.

18 Claims, 6 Drawing Sheets

DOCUMENT SUMMARIZATION

CROSS REFERENCE TO RELATED APPLICATIONS

This application claims the benefit of U.S. Provisional Application 60/856,665 filed Nov. 3, 2006.

BACKGROUND

Automatically summarizing a document may involve computer-generating summarizing items including a topic sentence, a set of topic words, and so on. These summarizing items may subsequently be used in applications including search engines, text mining, data mining, and so on. To automatically summarize a document, some applications may have used statistical methods (e.g., Hidden Markov Model), pre-built taxonomy and lexical chain analysis methods, linguistic methods (e.g., part of speech, noun phrases, name/entity extraction), and so on. However, these methods may not have produced summarizing items in a desired time frame and/or with a desired quality. Thus, applications using these methods may not have yielded, in a time-effective manner, a summary that supported achieving a desired recall, and/or precision.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example", does not necessarily refer to the same embodiment or example, though it may.

One embodiment of a method for computer-summarizing a document includes inputting a document(s) that includes terms arranged in sentences. A term-sentence matrix is constructed to relate the terms to the sentences and vice versa. Term scores and sentence scores may be computed while the matrix is built. Thus, grouping and scoring may proceed in parallel.

The method outputs a summarization item. The summarization item may be, for example, a term from the document, a set of terms, a sentence, a set of sentences, and so on. The summarization item may then be used in document searching, text mining, data mining, and so on.

A document may have more than one topic. Thus, the method may produce different summarization items for different topics appearing in the document. In one embodiment, after summarization items have been provided for one topic, terms and/or sentences associated with that topic may be logically removed from the document and/or the term-sentence matrix. In one embodiment, a method ranks terms and sentences simultaneously based on separate topics.

Term and sentence scoring is one adaptation to an iterative process described for simultaneously scoring hub nodes and authority nodes when a connectivity matrix is available. These term scores and sentence scores can be processed to produce a value for an element in a term-sentence matrix to which the adapted iterative process may be applied. In one embodiment, Kleinberg's Hyperlink Induced Topic Search (HITS) algorithm can provide a model for simultaneously ranking terms and sentences based on separate topics. The HITS algorithm ranks hub web pages and authority web pages at the same time by processing an adjacency link matrix. The HITS algorithm provides the logical basis for one method embodiment by providing a framework in which a sentence/term relationship may be analogized to a hub/authority relationship. The analogy is made between "a sentence contains a term" and "a hub page contains a hyperlink to an authority page". Using an approach that capitalizes on the analogy, a term/sentence matrix can be processed iteratively, similarly to how an adjacency link matrix is processed by HITS.

When considering the analogy, consider that a term/sentence matrix identifies correlations between words and sentences. A term/sentence matrix may also facilitate identifying relationships between words. Words having a tight relationship may help resolve word rank and sentence rank with respect to a central topic. Terms that are "referenced" by (e.g., appear in) more sentences, up to a limit, may be assigned a higher rank than terms that are referenced by fewer sentences. Some terms, referred to as "stop words" (e.g., the, to, in, of, a), that may appear in many sentences may provide little insight into a topic and thus may be given artificial ranks (e.g., zero). Sentences having a higher number of higher ranked words may be given a higher sentence score than sentences having fewer higher ranked words or having lower ranked words. Thus, heuristics may be layered on top of the basic analogy to craft the adapted process.

Relating HITS to single value decomposition (SVD) based latent semantic indexing (LSI) yields sentence and keyword ranks computed by the method embodiment being related to a central topic. LSI discovers topics and document clusters by decomposing a term-document matrix. HITS discovers hubs and authorities based on hyperlinks pointing from one page to another web page. If the analogy holds and the term-document matrix is treated as an adjacency matrix, then computing the principal eigenvectors for the link matrix can be equated to computing the first component decomposition in SVD based LSI.

Web hyperlinks can be viewed as part of a graph where nodes are web pages and directional edges are hyperlinks that point from one node to another. A hub node points to another page(s). An authority node is pointed to by another node(s). A node may be both a hub node and/or an authority node. Hub nodes may have hub scores and authority nodes may have authority scores. A hub node achieves a high score when it points to a large number of high scoring authority nodes. An authority node achieves a high score by being pointed to by a large number of high scoring hub nodes.

As described above, a sentence containing a term is analogous to a hub node containing a hyperlink to an authority node. Thus, a term-sentence matrix can be treated as a connectivity matrix between authority and hub nodes. The dimension of an term vector is the number of distinct terms found in a document and the dimension of a sentence vector is the number of sentences in the document.

In one embodiment, an iterative method computes term/sentence vectors starting with initial vectors $x^0$ and $y^0$ that are normalized to have unity lengths. The method updates vectors x and y based on the current value of x, y, and a term-sentence matrix A according to:

$$y^{(n+1)} = c^{(n+1)} A^T x^{(n)} \quad \text{Equation 1A}$$

$$x^{(n+1)} = d^{(n+1)} A y^{(n)} \quad \text{Equation 1B}$$

where the scales $c^{(n+1)}$ and $d^{(n+1)}$ maintain sentence/term vectors at unity length. The iterative method computes a sentence score as the summation of term scores weighted by the strength of linkage between the sentence and the term. The iterative method computes the term score as the summation of sentence scores weighted by the strength of linkage between the sentence and the term.

In one embodiment, equations 1A and 1B can be rewritten in another form as:

$$y^{(n+2)} = c^{(n+2)} d^{(n+1)} A^T A y^{(n)} \quad \text{Equation 2A}$$

$$x^{(n+2)} = c^{(n+1)} d^{(n+2)} A A^T x^{(n)} \quad \text{Equation 2B}$$

It is apparent to one skilled in the art therefore that this iterative method will yield the principal eigenvectors of symmetric matrices $A^T A$ and $AA^T$ respectively, where $A^T A$ is a sentence/sentence concurrence matrix and $AA^T$ is a term/term concurrence matrix.

LSI is used in information retrieval to determine a latent topic in a document. One LSI method uses SVD to decompose a term-sentence matrix into the product of three matrices. The decomposition resulting from applying SVD to a term-sentence matrix A is $$A = \Lambda U V^T$$

where the matrices U and V are orthogonal in that their columns are orthonormal. This SVD decomposition can be rewritten as the summation of a series of matrix compositions that correspond to one eigenvalue:

$$A = \lambda_1 u_1 v_1^T + \lambda_2 u_2 v_2^T + \lambda_3 u_3 v_3^T + \ldots$$

where eignenvalues (the diagonal elements in matrix $\Lambda$) are ordered as:

$$\lambda_1 > \lambda_2 > \lambda_3 > \ldots$$

In one embodiment, HITS can be adapted to process a term-sentence matrix and to compute the first decomposition corresponding to the principal eigenvalue and eigenvectors for SVD based LSI. After applying the adapted HITS based process to a term-sentence matrix, sentence and term rankings based on the central topic are available.

In one embodiment, the adapted HITS based process can be extended to compute subsequent decompositions based on subsequent eigenspaces. These decompositions can then be used to determine summarization items to provide for different topics for the document. One example extension can be seen by subtracting a principal decomposition from the SVD decomposition:

$$A_1 = A - \lambda_1 u_1 v_1^T = \lambda_2 u_2 v_2^T + \lambda_3 u_3 v_3^T + \ldots$$

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a machine-readable medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 1:
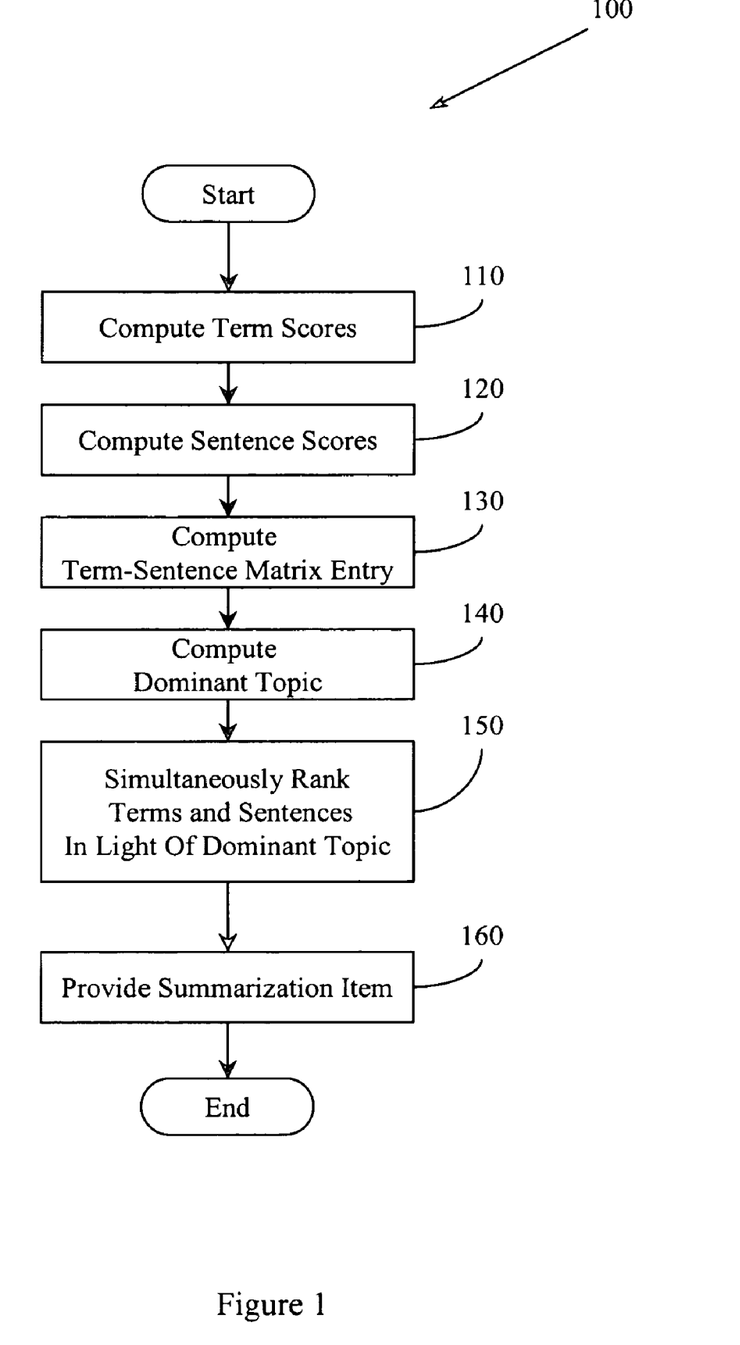
FIG. 1 illustrates an example method associated with automatically summarizing a document.

FIG. 1 illustrates a method 100 associated with automatically summarizing a document. The method 100 may include, at 110, computing a term score for a member of a set of terms in the document. The document may be, for example, a text file, an email, a letter stored in electronic form, a Word file, and so on. In one example, a term score may depend on a number of uni-grams in a term and a number of sentences in which a term appears. In one embodiment, a hyperbolic curve associated with a resolving power of significant words may modify the score. For example, a term score $S(t)$ may be computed according to: $S(t)=(a-b(sf_t/N-c)^2)*f(ng)$, where a, b, and c are pre-determined, configurable constants, $sf_t$ is the number of sentences in which term t occurs, N is the total number of sentences, and $f(ng)$ is a function. In one embodiment, $f(ng)$ may return a penalizing value for terms having a single uni-gram, a linearly increasing value for terms having two to four uni-grams, and a constant value for terms having more than four uni-grams. It is to be appreciated that in different embodiments a, b, and c may have different values and that $f(ng)$ may perform differently.

The method 100 may also include, at 120, computing a sentence score for a member of a set of sentences in the document. In one example, the sentence score may depend on a length of a sentence measured in uni-grams and a position of a sentence in a paragraph in the document. For example, a sentence appearing near the beginning of a paragraph may be scored higher to support the heuristic that it is more likely to be a topic sentence.

The method 100 may also include, at 130, computing a set of entries for a term-sentence matrix. The term-sentence matrix may relate terms to sentences. A sentence may have one or more terms and a term may appear in one or more sentences. Thus, in one example, the value of an entry in the term-sentence matrix may depend on both a term score and a sentence score. For example, the value for entry $S(t,s)$ may be computed according to: $S(t,s)=S(t)*S(s)$, when sentence s contains term t and where $S(t,s)=0$ otherwise. $S(t)$ is the term score and $S(s)$ is the sentence score.

The method 100 may also include, at 140, computing a dominant topic for the document. In one embodiment, computing the dominant topic may include computing a term eigenvector. In the term eigenvector, vector members may represent a relevancy of a term to the dominant topic. Computing the dominant topic may also include computing a sentence eigenvector. In the sentence eigenvector, vector members may represent a relevancy of a sentence to the dominant topic. In one example, the term eigenvector u1 is computed as the value that results at the convergence of:

$$x^{2n} = \left(\prod_{i=1}^{n} (c^{2i} d^{2i-1})\right)(AA^T)^n x^0$$

where the product of c and d is a scale to maintain a vector at unity length, where $AA^T$ is a term-term concurrence matrix, and where $x^0$ is the initial x vector. In one example, the sentence eigenvector v1 is computed as the value that results at the convergence of:

$$y^{2n} = \left(\prod_{i=1}^{n} (c^{2i-1} d^{2i})\right)(A^T A)^n y^0,$$

where $A^T A$ is a sentence-sentence concurrence matrix, and where $y^0$ is the initial y vector.

The method 100 may also include, at 150, simultaneously ranking the set of terms and the set of sentences based, at least in part, on the dominant topic. The method 100 may also include, at 160, providing a summarization item. The summarization item may be, for example, a term, a sentence, and so on. The summarization item may be selected based, for example, on a ranking of the set of terms, on a ranking of the set of sentences, on a term rank, on a sentence rank, and so on. Providing the summarization item may include, for example, generating a signal, updating a computer-based file, producing a new electronic file stored on a machine-readable medium, passing a value to a downstream application (e.g., search engine), and so on.

While FIG. 1 illustrates various actions occurring in serial, it is to be appreciated that various actions illustrated in FIG. 1 could occur substantially in parallel. By way of illustration, a first process could compute term scores and a second process could compute sentence scores. While two processes are described, it is to be appreciated that a greater and/or lesser number of processes could be employed and that lightweight processes, regular processes, threads, and other approaches could be employed.

In one example, a method may be implemented as processor executable instructions. Thus, in one example, a machine-readable medium may store processor executable instructions that if executed by a machine (e.g., processor) cause the machine to perform a method that includes computing a term score, computing a sentence score, and computing a set of entries for a term-sentence matrix that relates terms to sentences. The method may also include computing a dominant topic for the document by computing a term eigenvector and by computing a sentence eigenvector. The method may also include simultaneously ranking terms and sentences in light of the dominant topic. The method may conclude by providing a summarization item (e.g., term, sentence) selected based on the term ranking and/or the sentence ranking. While the above method is described being stored on a machine-readable medium, it is to be appreciated that other example methods described herein may also be stored on a machine-readable medium.

Figure 2:
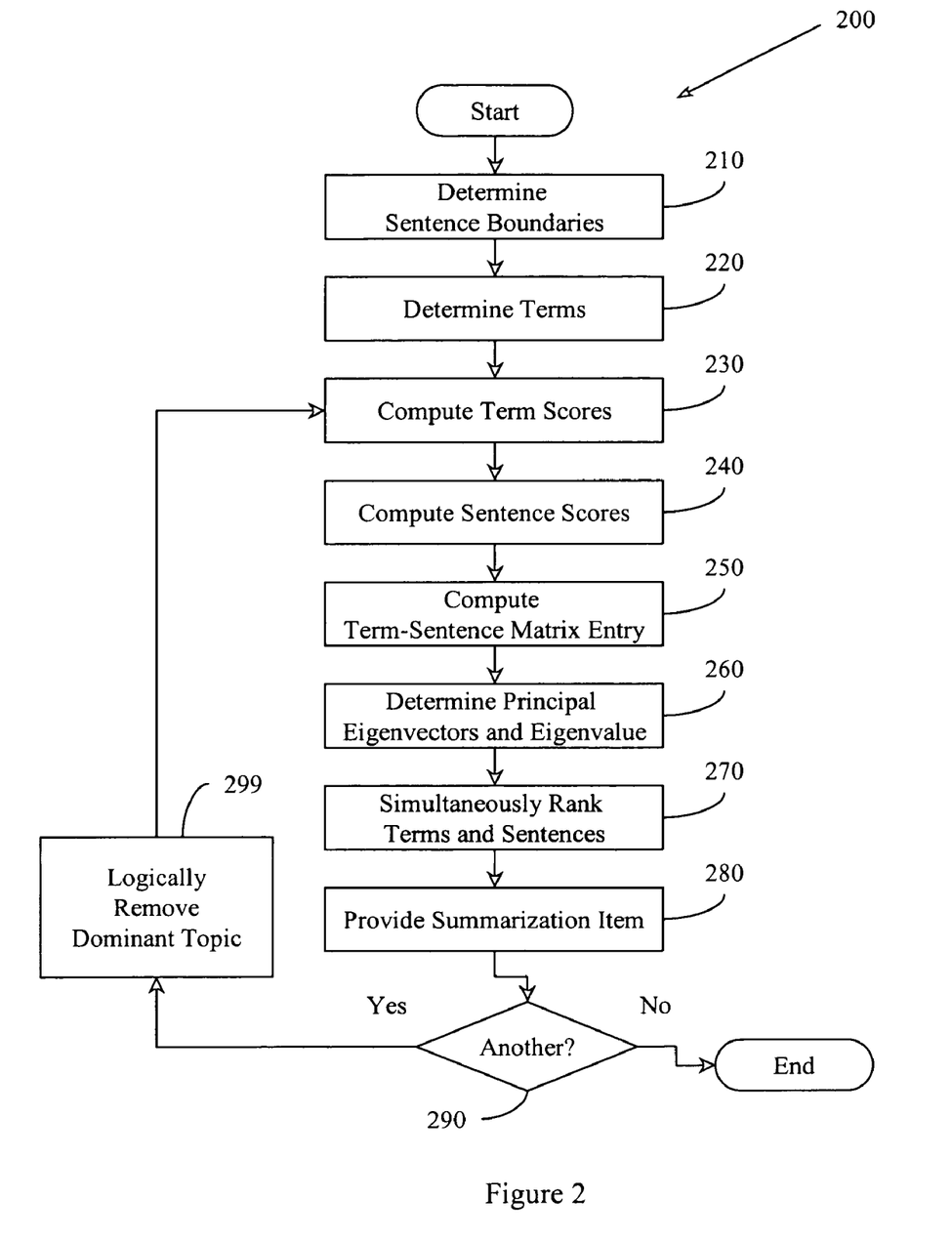
FIG. 2 illustrates an example method associated with automatically summarizing a document.

FIG. 2 illustrates a method 200 associated with automatically summarizing a document. The method 200 includes some actions similar to actions described in connection with the method 100 (FIG. 1). For example, the method 200 includes computing terms scores at 230, computing sentence scores at 240, computing a term-sentence matrix entry at 250, simultaneously ranking terms and sentences at 290, and providing a summarization item at 280.

The method 200 may also include additional actions including, for example, pre-processing actions. For example, the method 200 may include, at 210, determining sentence boundaries in the document to be summarized and, at 220, determining which terms appear in the document. Determining sentence boundaries may include, for example, parsing the document to find sentence delimiters. In one embodiment, a term may be an n-gram, n being an integer from one to four. In different embodiments, n-grams having different lengths may be processed. The method 200 may also determine which terms are to be processed (e.g., scored, included in matrix, ranked) by applying a simplified Porter stemming process to a term, by removing a term that begins with a stop-word, by removing a term that ends with a stop-word, by removing a term that is a stop-word, and so on. It is to be appreciated that in different embodiments terms may be identified and included using different combinations of these actions.

Method 200 may also include computing subsequent dominant topics after a first dominant topic has been computed. Thus, the method 200 includes, at 290, making a determination concerning whether another topic is to be computed. If the determination at 290 is no, then the method 200 may end. However, if the determination at 290 is Yes, then processing may proceed to 299 where a dominant topic may be logically removed. Logically removing a topic may include, for example, at 299, logically removing a term from the set of terms. Which term(s) is removed may depend on a relationship between the term and with the dominant topic. For example, a term that ranked highest in light of the dominant topic may have been provided at 280 and subsequently removed at 299 from the set of terms and/or from the term-sentence matrix. The method 200 may also include, at 299, logically removing a sentence from the set of sentences. Which sentence(s) is removed may depend on a relationship between the sentence and the dominant topic. For example, the sentence most closely related to the dominant topic may be removed. Therefore, in one embodiment, the dominant topic may be "subtracted" from the original term-sentence matrix, which facilitates extracting corresponding term/sentences for the next topic.

After removing the dominant topic by, for example, removing terms related to the dominant topic and/or sentences related to the dominant topic, the method 200 may return to a previous point (e.g., block 230) to determine a subsequent dominant topic for the document. While the method 200 is illustrated returning to block 230, it is to be appreciated that in different embodiments processing may return to other points.

Figure 3:
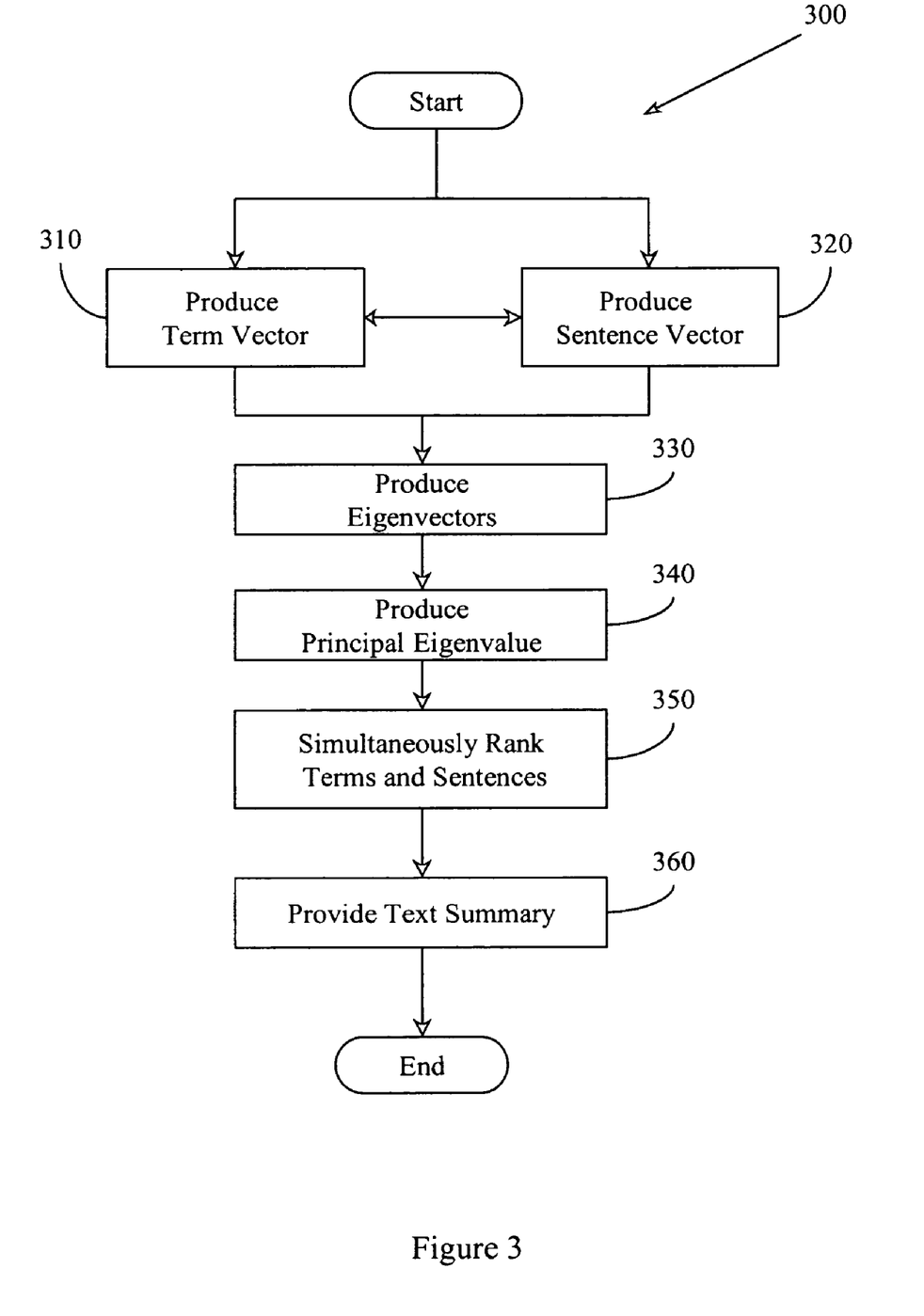
FIG. 3 illustrates an example method associated with automatically summarizing a text.

FIG. 3 illustrates a method 300 associated with automatically summarizing a text. The method 300 may include, at 310, producing a term vector that is based on terms found in the text. The method 300 may also include, at 320, producing a sentence vector that is based on sentences found in the text. Blocks 310 and 320 are illustrated as being able to be performed at least partially in parallel.

In one embodiment, the dimension of the term vector equals the number of unique terms in the text to be summarized. Producing the term vector may include, for example, iteratively updating an initial term vector $x^0$ according to: $x^{(n+1)} = d^{(n+1)} A y^{(n)}$, where $x^{(n+1)}$ is the updated vector, $d^{(n+1)}$ is a scale to make $x^{(n+1)}$ have unity length, A is a term-sentence matrix, and $y^{(n)}$ is a sentence vector. In one embodiment, the dimension of the sentence vector equals the number of sentences in the text to be summarized. Producing the sentence vector may include iteratively updating an initial sentence vector $y^0$ according to $y^{(n+1)}=c^{(n+1)}A^T x^{(n)}$, where $y^{(n+1)}$ is the updated vector, $c^{(n+1)}$ is a scale to make $y^{(n+1)}$ have unity length, and $x^{(n)}$ is a term vector.

The method 300 may also include, at 330, producing a term eigenvector based on the term vector and the sentence vector and producing a sentence eigenvector based on the term vector and the sentence vector. In one embodiment, producing a term eigenvector based on the term vector and the sentence vector includes computing a term eigenvector u1. In one embodiment, producing a sentence eigenvector based on the term vector and the sentence vector includes computing a sentence eigenvector v1.

The method 300 may also include, at 340, producing a principal eigenvalue related to the text. In one embodiment, the principal eigenvalue depends, at least in part, on both the term eigenvector u1 and the sentence eigenvector v1. Thus, the method 300 may also include, at 350, simultaneously calculating a term ranking and a sentence ranking based, at least in part, on the principal eigenvalue.

The method 300 may also include, at 360, providing a text summary. The text summary may be, for example, a term, a sentence, and so on. In one example, the text summary provided may depend on the term ranking and/or the sentence ranking. For example, the text summary may be the highest ranked sentence, the highest ranked term, the highest ranked term(s) in the highest ranked sentence(s), and so on.

Figure 4:
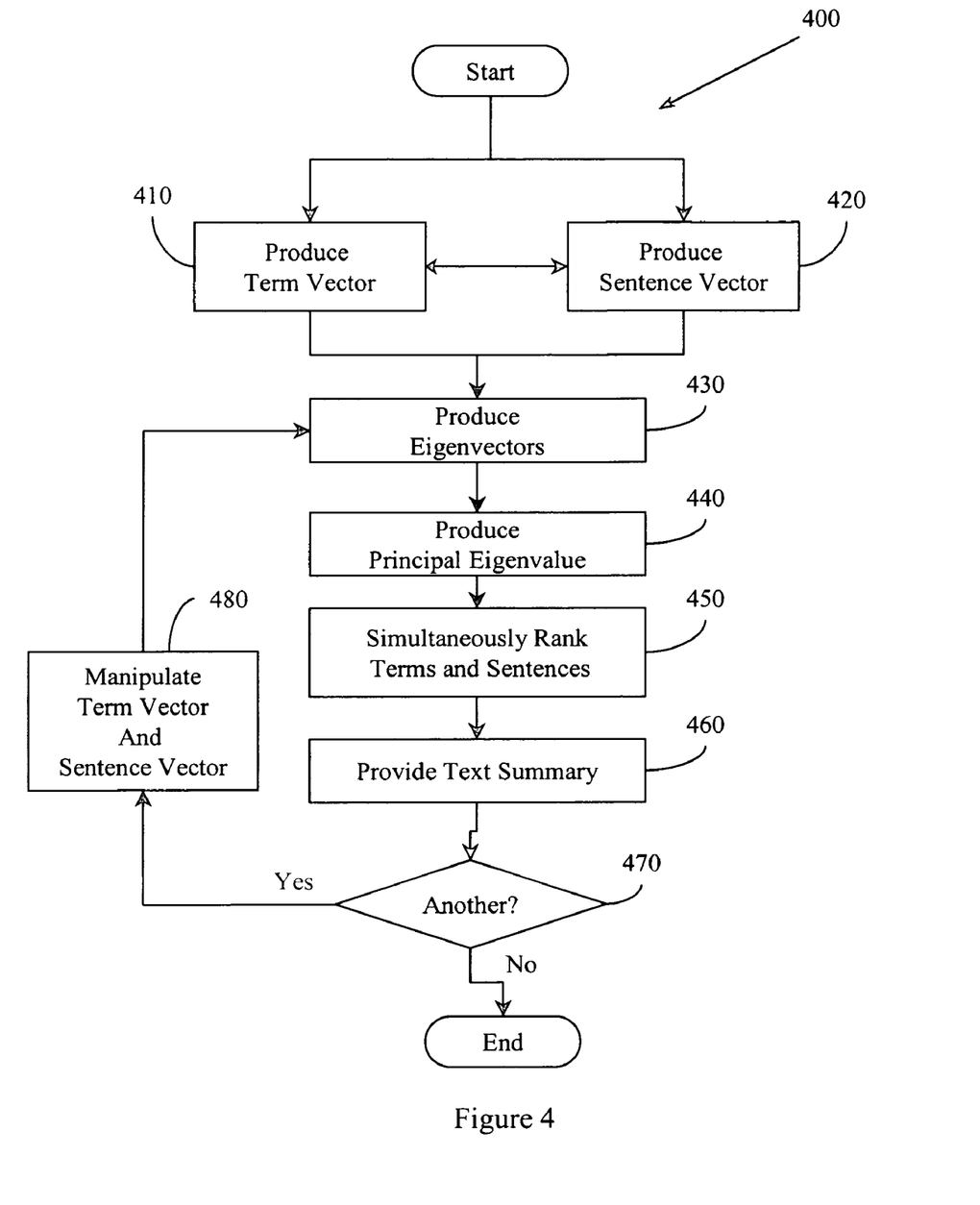
FIG. 4 illustrates an example method associated with automatically summarizing a text.

FIG. 4 illustrates a method 400 associated with automatically summarizing a text. The method 400 performs several actions similar to those described in connection with the method 300 (FIG. 3). For example, the method 400 includes producing a term vector at 410, producing a sentence vector at 420, producing eigenvectors at 430, producing a principal eigenvalue at 440, simultaneously ranking terms and sentences at 450, and providing a text summary at 460. However, method 400 also includes selectively determining subsequent additional topics and selectively producing additional eigenvectors, eigenvalues, rankings, and so on.

Thus, the method 400 includes, at 470, making a determination concerning whether another topic is to be considered. If the determination is No, then processing may conclude. If the determination at 470 is Yes, then processing may proceed to 480. At 480, the term vector and/or the sentence vector may be manipulated. For example, terms and/or sentences provided in the text summary may be removed, logically and/or physically, from a copy of the text, and thus new vectors may be created. In another example, entries relating terms and sentences may be logically and/or physically removed from a term-sentence matrix.

In one embodiment, the processing at 480 may include removing a current decomposition $\lambda_1 u_1 v_1^T$ from a term-sentence matrix according to: $A_1 = A - \lambda_1 u_1 v_1^T = \lambda_2 u_2 v_2^T + \lambda_3 u_3 v_3^T + \ldots$, where $A_1$ is the term-sentence matrix after decomposition $\lambda_1 u_1 v_1^T$ is removed, A is the term-sentence matrix before decomposition $\lambda_1 u_1 v_1^T$ is removed, $\lambda_1$ is an eigenvalue for matrix A, $u_1$ is an eigenvector corresponding to $\lambda_1$ for a matrix $AA^T$, and $v_1$ is an eigenvector corresponding to $\lambda_1$ for a matrix $A^T A$.

Figure 5:
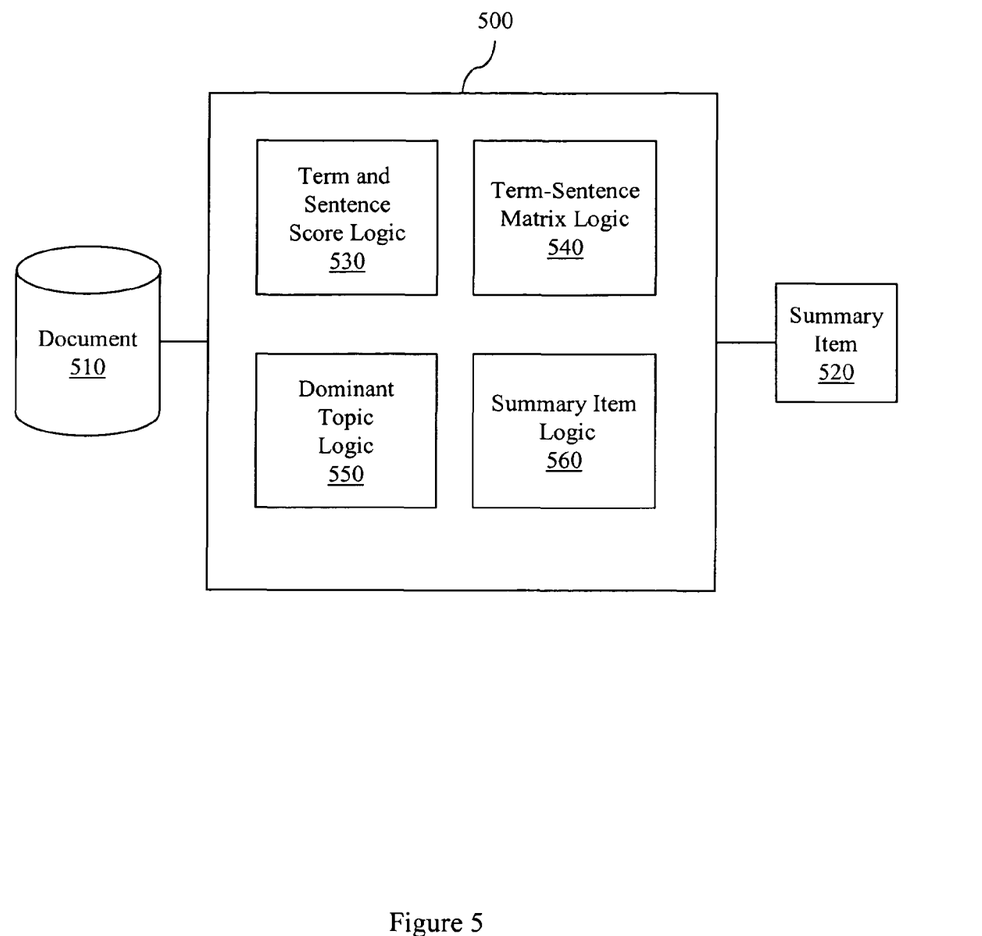
FIG. 5 illustrates elements of an example system associated with automatically summarizing a document.

FIG. 5 illustrates elements of a system 500 associated with automatically summarizing a document 510. The system 500 may input the document 500 and output a summary item 520. The summary item 520 may be, for example, a sentence in the document 510, a word(s) in the document 510, and so on.

The system 500 may include a term and sentence logic 530 that identifies terms and sentences in the document 510. The logic 530 may also produce term scores for terms in the document 510. The term scores may describe, for example, the likelihood that a term can facilitate uniquely identifying the document 510 and/or a topic in the document 510. In one embodiment, the term score may depend on a number of uni-grams in the term and a number of sentences in which the term appears.

The logic 530 may also produce sentence scores for sentences in the document 510. The sentence scores may describe, for example, a potential relevancy of a sentence to a dominant topic in the document 510. In one embodiment, the sentence scores may depend on the number of uni-grams in a sentence and/or where the sentence is positioned in a paragraph.

The system 500 may also include a term-sentence matrix logic 540 to produce a term-sentence matrix from the terms and the sentences identified by the term and sentence logic 530. An entry in the term-sentence matrix may relate a term to a sentence based on the term scores and sentence scores computed by the term and sentence logic 530.

The system 500 may also include a dominant topic logic 550 to determine a dominant topic for the document 510. In one embodiment, the dominant topic logic 550 computes an initial term vector and an initial sentence vector, computes a term eigenvector and a sentence eigenvector using a converging iterative process, and computes a term-sentence matrix eigenvalue from the term eigenvector and the sentence eigenvector. In one embodiment, the dominant topic logic 550 may use an iterative Single Value Decomposition (SVD) based hybrid LSI-HITS (Latent Semantic Index, Hyperlink Induced Topic Search) approach to compute the eigenvectors and eigenvalues that are used to determine the dominant topic. In one embodiment, the dominant topic logic 550 may be configured to subtract the dominant topic from an original term-sentence matrix. Thus the initial term vector and initial sentence vector may be manipulated. This facilitates extracting corresponding term/sentences for the next topic.

The system 500 may also include a summary item selection logic 560 to select the summary item(s) 530. In one embodiment, the selection may be based on a simultaneous ranking of terms and sentences related to the dominant topic.

Figure 6:
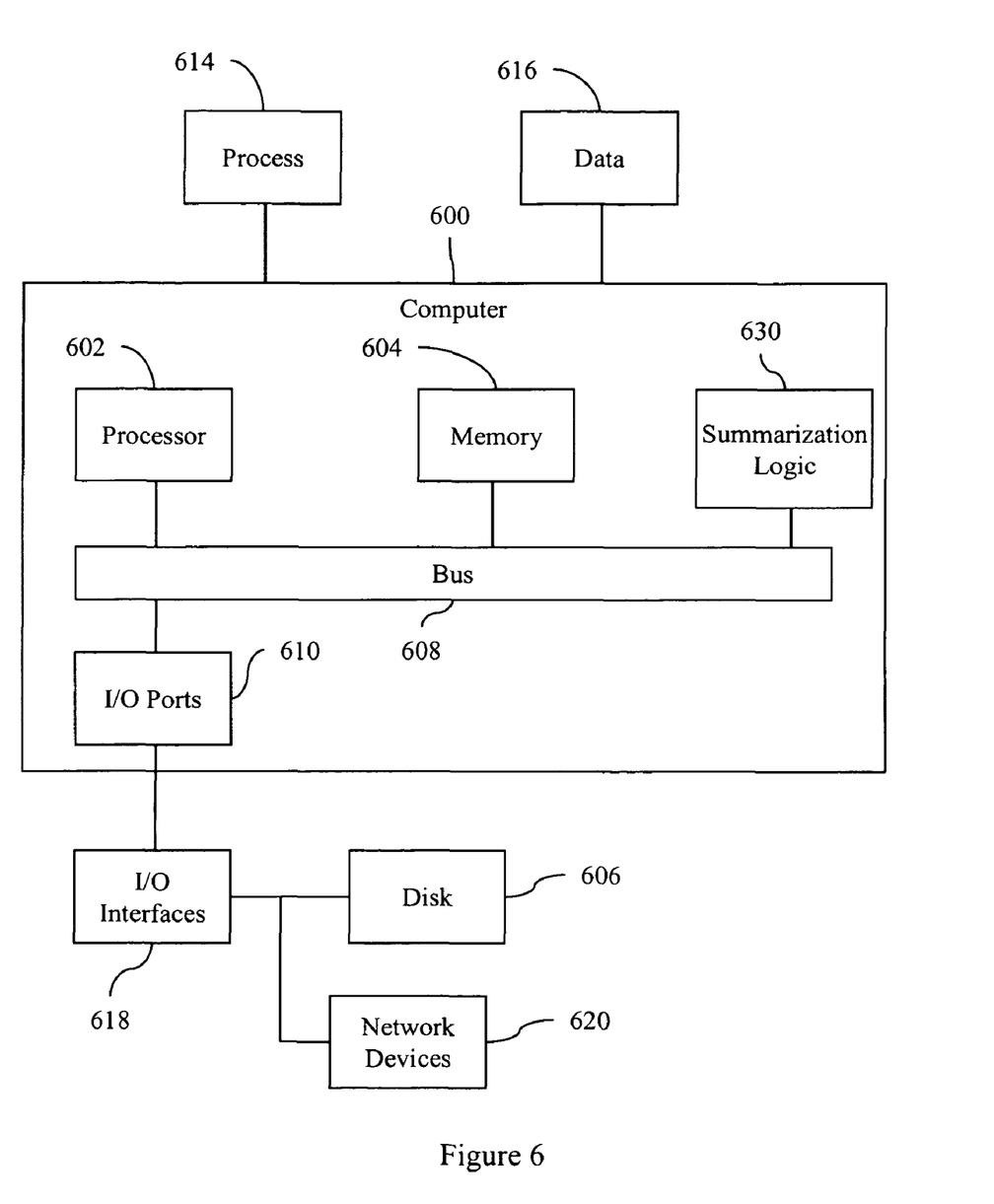
FIG. 6 illustrates an example computing environment in which example systems and methods illustrated herein may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a summarization logic 630 configured to facilitate automatically providing a summarization item(s) (e.g., word, sentence) for a document. In different examples, the logic 630 may be implemented in hardware, software, firmware, and/or combinations thereof. Thus, the logic 630 may provide means (e.g., hardware, software, firmware) for generating a term-sentence matrix for a document to be characterized, means for determining a dominant topic for the document from the term-sentence matrix, and means for providing a term and/or sentence that characterize the document. In one embodiment, the means for determining the dominant topic may perform an iterative Single Value Decomposition (SVD) based hybrid LSI-HITS (Latent Semantic Index, Hyperlink Induced Topic Search) process on the term-sentence matrix. While the logic 630 is illustrated as a hardware component attached to the bus 608, it is to be appreciated that in one example, the logic 630 could be implemented in the processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, and/or a memory stick. Furthermore, the disk 606 may be a CD-ROM, a CD recordable drive (CD-R drive), a CD rewriteable drive (CD-RW drive), and/or a digital video ROM drive (DVD ROM), and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, SATA, Infiniband, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A machine-readable medium having stored thereon machine-executable instructions that when executed by a machine cause the machine to perform a method, the method comprising:

computing a term score for a member of a set of terms in a document to be summarized, where the term score is computed according to:

$S(t) = (a - b(sf_t/N - c)^2) * f(ng)$

S(t) being the term score;
a, b, and c being pre-determined, configurable constants;
$sf_t$ being the number of sentences in which term t occurs;
N being the total number of sentences; and
f(ng) being a function that returns a penalizing value for terms having a single uni-gram, a linearly increasing value for terms having two to four uni-grams, and a constant value for terms having more than four uni-grams;

computing a sentence score for a member of a set of sentences in the document;

computing a set of entries for a term-sentence matrix that relates members of the set of terms to members of the set of sentences, a sentence containing one or more terms, a term appearing in one or more sentences;

computing a dominant topic for the document by computing a term eigenvector, where a member of the term eigenvector represents a relevancy of a term to the dominant topic, and by computing a sentence eigenvector, where a member of the sentence eigenvector represents a relevancy of a sentence to the dominant topic;

simultaneously ranking the set of terms and the set of sentences based, at least in part, on the dominant topic; and providing a summarization item selected from one or more of, the set of terms, and the set of sentences, the summarization item being selected based, at least in part, on one or more of, a ranking of the set of terms, and a ranking of the set of sentences, where the term score and sentence score are computed in parallel while computing the set of entries for the term-sentence matrix.

2. The machine-readable medium of claim 1, a term score for a term depending, at least in part, on a number of uni-grams in the term and a number of sentences in which the term appears.

3. The machine-readable medium of claim 2, a sentence score depending, at least in part, on a length of a sentence measured in uni-grams and a position of a sentence in a paragraph in the document.

4. The machine-readable medium of claim 3, where a value of an entry in the set of entries for the term-sentence matrix depends, at least in part, on a term score and a sentence score.

5. The machine-readable medium of claim 4, where the value of an entry in the set of entries is computed according to:

$$S(t, s) = S(t) * S(s), \text{ when sentence } s \text{ contains term } t,$$
$$= 0, \text{ otherwise;}$$

where S(t,s) is the entry;
S(t) is the term score; and
S(s) is the sentence score.

6. The machine-readable medium of claim 1, where computing the dominant topic for the document to be summarized includes:

computing a term eigenvector u1 according to:

$$x^{2n} = \left(\prod_{i=1}^{n}(c^{2i}d^{2i-1})\right)(AA^T)^n x^0$$

where the product of c and d is a scale to maintain a vector at unity length;
where $AA^T$ is a term-term concurrence matrix;
where $x^0$ is the initial x vector; and
where $x^{2n}$ is the resulting x vector;
and
computing a sentence eigenvector v1 according to:

$$y^{2n} = \left(\prod_{i=1}^{n}(c^{2i-1}d^{2i})\right)(A^T A)^n y^0$$

where $A^T A$ is a sentence-sentence concurrence matrix;
where $y^0$ is the initial y vector; and
where $y^{2n}$ is the resulting y vector.

7. The machine-readable medium of claim 1, the method including determining one or more sentence boundaries in the document to be summarized.

8. The machine-readable medium of claim 1, a term comprising an n-gram, n being an integer from one to four.

9. The machine-readable medium of claim 8, the method including:
applying a simplified Porter stemming process to a term;
removing from the set of terms a term that begins with a stop-word;
removing from the set of terms a term that ends with a stop-word; and
removing from the set of terms a term that is a stop-word.

10. The machine-readable medium of claim 1, the method including logically removing one or more members of the set of terms from the set of terms based on a relation with the dominant topic and logically removing one or more members of the set of sentences from the set of sentences based on a relation with the dominant topic.

11. The machine-readable medium of claim 10, the method including determining a subsequent dominant topic for the document.

12. A system, comprising:
a processor;
a memory; and
an interface connecting the processor, the memory, and one or more logics, the logics including:
a term and sentence logic to identify one or more terms in a document and to identify one or more sentences in the document, to produce a term score related to a uniqueness value for a term, and to produce a sentence score related to a potential topic relevancy value for a sentence, where the term score is computed according to:

$S(t)=(a-b(sf_t/N-c)^2)*f(ng)$

S(t) being the term score;
a, b, and c being pre-determined, configurable constants;
$sf_t$ being the number of sentences in which term t occurs;
N being the total number of sentences; and
f(ng) being a function that returns a penalizing value for terms having a less than a first number of uni-grams, a linearly increasing value for terms having between the first number of uni-grams and a second number of uni-grams, and a constant value for terms having more than the second number of uni-grams;
a term-sentence matrix logic to produce a term-sentence matrix from the one or more terms and the one or more sentences, where an entry in the term-sentence matrix relates a term to a sentence based, at least in part, on a term score for the term and a sentence score for the sentence;
a dominant topic logic to determine a dominant topic for the document based, at least in part, on iterative Single Value Decomposition (SVD) based hybrid LSI-HITS (Latent Semantic Index, Hyperlink Induced Topic Search) processing; and
a summary item selection logic to select one or more summary items based, at least in part, on a simultaneous ranking of terms and sentences related to the dominant topic.

13. The system of claim 12, the term score depending, at least in part, on a number of uni-grams in the term and a number of sentences in which the term appears, the sentence score depending, at least in part, on a length of a sentence measured in uni-grams and a position of a sentence in a paragraph.

14. The system of claim 13, where the dominant topic logic computes an initial term vector and an initial sentence vector, computes a term eigenvector and a sentence eigenvector using an iterative process applied to the initial term vector and the initial sentence vector, and computes a term-sentence matrix eigenvalue from the term eigenvector and the sentence eigenvector.

15. A system, comprising:
a processor;
a memory;
means for generating a term-sentence matrix for a document to be characterized, where term score elements of the term-sentence matrix are based, at least in part, on a term score computed according to:

$S(t)=(a-b(sf_t/N-c)^2)*f(ng)$

S(t) being the term score;
a, b, and c being pre-determined, configurable constants;
$sf_t$ being the number of sentences in which term t occurs;
N being the total number of sentences; and
f(ng) being a function that returns a penalizing value for terms having less than a first number of uni-grams, an increasing value for terms having more than the first number of uni-grams but less than a second number of uni-grams, and a constant value for terms having more than the second number of uni-grams;
means for determining a dominant topic for the document from the term-sentence matrix, where determining the dominant topic includes performing an iterative Single Value Decomposition (SVD) based hybrid LSI-HITS (Latent Semantic Index, Hyperlink Induced Topic Search) process; and
means for providing one or more of, a term, and a sentence that characterize the document based, at least in part, on the dominant topic.

16. The system of claim 15, the first number of uni-grams being 1, the second number of uni-grams being 4.

17. The system of claim 16, the increasing value being a linearly increasing value.

18. The system of claim 12, the first number of uni-grams being 1, the second number of uni-grams being 4.

* * * * *

UNITED STATES PATENT AND TRADEMARK OFFICE
CERTIFICATE OF CORRECTION

| | |
|---|---|
| PATENT NO. | : 7,783,640 B2 |
| APPLICATION NO. | : 11/647871 |
| DATED | : August 24, 2010 |
| INVENTOR(S) | : Liao et al. |

It is certified that error appears in the above-identified patent and that said Letters Patent is hereby corrected as shown below:

In column 3, line 15, delete "an" and insert -- a --, therefor.

In column 3, line 58, delete "eignenvalues" and insert -- eigenvalues --, therefor.

In column 5, line 22-23, delete "servelet," and insert -- servlet, --, therefor.

Signed and Sealed this
Tenth Day of May, 2011

David J. Kappos
*Director of the United States Patent and Trademark Office*